(12) United States Patent
Oriet et al.

(10) Patent No.: US 7,789,427 B2
(45) Date of Patent: Sep. 7, 2010

(54) CHASSIS FRAME OF A MOTOR VEHICLE

(75) Inventors: Leo P. Oriet, Rochester Hills, MI (US); Jules Cazabon, Staples (CA)

(73) Assignee: Navistar Canada, Inc. (CA)

( * ) Notice: Subject to any disclaimer, the term of this patent is extended or adjusted under 35 U.S.C. 154(b) by 321 days.

(21) Appl. No.: 12/055,377

(22) Filed: Mar. 26, 2008

(65) Prior Publication Data

US 2009/0241462 A1 Oct. 1, 2009

(51) Int. Cl.
*B62D 21/00* (2006.01)
(52) U.S. Cl. .................. 280/782; 180/311; 296/203.01
(58) Field of Classification Search ................ 280/782, 280/797, 800, 781; 52/653.2, 745.19; 296/203.01; 180/311
See application file for complete search history.

(56) References Cited

U.S. PATENT DOCUMENTS

| | | | | | |
|---|---|---|---|---|---|
| 1,471,044 | A | * | 10/1923 | Lovejoy | ..................... 280/797 |
| 1,954,078 | A | * | 4/1934 | Greig | .......................... 280/800 |
| 2,843,231 | A | * | 7/1958 | Maruhn | ...................... 403/187 |
| 3,188,110 | A | * | 6/1965 | Wessells, III | ............... 280/781 |
| 3,580,611 | A | * | 5/1971 | McNitt | ........................ 280/433 |
| 4,674,770 | A | * | 6/1987 | Inagaki | ........................ 280/797 |
| 5,378,006 | A | * | 1/1995 | Stuart et al. | .............. 280/149.2 |
| 5,507,522 | A | * | 4/1996 | Ritchie | ........................ 280/800 |
| 5,630,306 | A | * | 5/1997 | Wylie | ....................... 52/786.13 |
| 5,725,247 | A | * | 3/1998 | Nilsson et al. | .............. 280/781 |
| 5,755,486 | A | * | 5/1998 | Wycech | ................. 296/187.02 |
| 6,010,155 | A | * | 1/2000 | Rinehart | ...................... 280/781 |
| 6,189,930 | B1 | * | 2/2001 | Kalazny | ...................... 280/781 |
| 6,733,040 | B1 | * | 5/2004 | Simboli | ....................... 280/800 |
| 7,261,322 | B2 | * | 8/2007 | Ito et al. | ...................... 280/781 |
| 7,600,785 | B2 | * | 10/2009 | Ramsey | ...................... 280/781 |
| 2007/0102913 | A1 | * | 5/2007 | Ramsey | ....................... 280/783 |

* cited by examiner

*Primary Examiner*—Paul N Dickson
*Assistant Examiner*—Timothy D Wilhelm
(74) *Attorney, Agent, or Firm*—Jeffrey P. Calfa; Mark C. Bach

(57) ABSTRACT

A chassis frame (10) uses channels as right and left side rails (12, 14). A lower "clam" (22) has a horizontal bottom wall (26L) that bridges the side rails and is disposed against bottom flanges (20R, 20L) of the side rail channels and vertical side flanges (28L, 30L) that extend from opposite sides of the bottom wall upward and against a face of a respective one of vertical walls (16R, 16L) of the channels that is exterior to the interior of the respective channel. An upper "clam" (24) is a mirror image of the lower "clam" and fits over the side rails. Spacer structure (30, 31, 38A, 38B, 40A, 40B) is disposed between and in abutment with the side rail channels and between and in abutment with the "clams" in inwardly spaced relation to the side rail channels. Fasteners (48, 50, 56, 62) fasten various parts together to complete the cross member that is formed by the "clams" and the spacer structure.

15 Claims, 3 Drawing Sheets

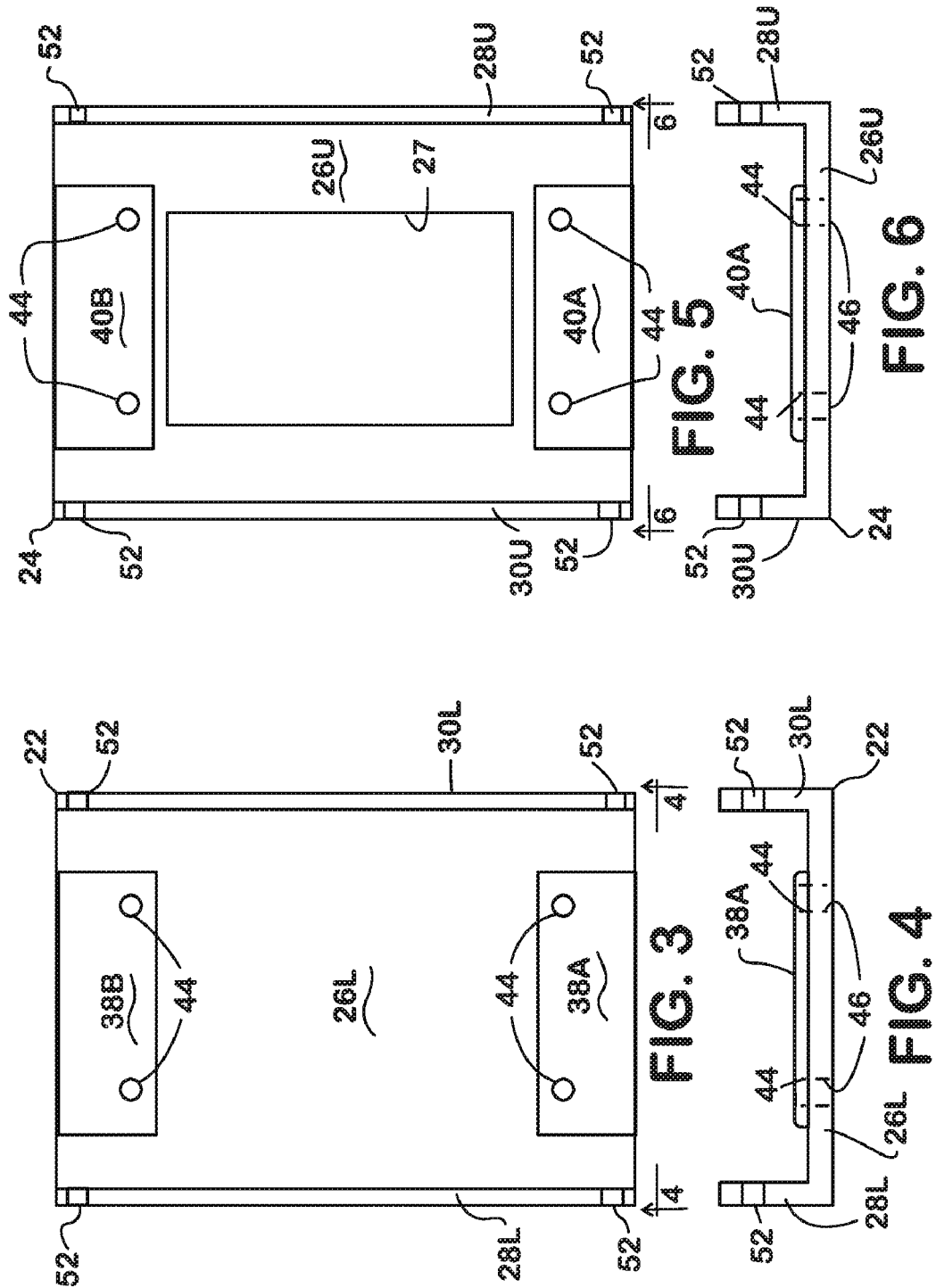

CHASSIS FRAME OF A MOTOR VEHICLE

FIELD OF THE INVENTION

This invention relates to a chassis frame of a motor vehicle, for example a chassis frame of a heavy truck, such as a highway tractor, or other large vehicle.

BACKGROUND OF THE INVENTION

A typical construction for a heavy truck is based on a steel chassis frame. A cab for the driver is mounted atop the frame. An engine is mounted on the frame in front of the cab. Suspension systems for the wheels attach to the frame. Various components of a drivetrain that couples the engine to driven wheels are supported on the frame, as are components of various other systems such as brake and steering systems. In the case of a highway tractor, a fifth wheel is mounted atop the rear of the frame.

A common construction for a chassis frame comprises right and left frame rails that run lengthwise of the truck. At various locations along their lengths, the rails are bridged by cross members. Assembly of a truck frame at a truck assembly plant is rather labor- and part-intensive because the ends of the cross members are typically fastened to the rails by a number of fasteners. Longer truck frames usually have more cross members, and hence their assembly requires more fasteners and fastening operations, running into the hundreds of parts. The process also uses a significant amount of plant floor space.

Forces and torques that are exerted on the chassis frame when the vehicle is being driven cause some bending and twisting of the frame. Extreme forces and torques cause more severe frame deformation. Over time, repeated frame deformations may degrade the quality of ride and road handling performance.

SUMMARY OF THE INVENTION

The inventors believe that a more rigid chassis frame would provide a commercial truck manufacturer with a significant competitive advantage, especially if the more rigid frame can be assembled with fewer parts and fastening operations, and in a smaller floor space in an assembly plant. A more rigid frame would experience less deformation and thereby provide improved durability.

If such a frame could incorporate one or more additional functional features, such as a battery compartment, the frame would provide further advantage.

Accordingly, one generic aspect of the invention relates to a chassis frame comprising right and left side rails running lengthwise of the frame and comprising respective channels each of which has an interior bounded by a vertical wall and horizontal top and bottom flanges that extend from top and bottom of the vertical wall toward corresponding flanges of the opposite side rail.

A lower channel, sometimes referred to as a lower "clam", runs lengthwise of the frame and comprises a horizontal bottom wall that bridges the side rails and is disposed against the bottom flanges of the side rail channels and vertical side flanges that extend from opposite sides of the bottom wall upward and against a face of a respective one of the vertical walls that is exterior to the interior of the respective channel.

An upper channel, sometimes referred to as an upper "clam," runs lengthwise of the frame and comprises a horizontal top wall that bridges the side rails and is disposed against the top flanges of the side rail channels and vertical side flanges that extend from opposite sides of the top wall downward and against the exterior face of a respective one of the vertical walls of the respective channel.

Spacer structure is disposed vertically between the upper and lower channels and horizontally between and in abutment with the side rail channels.

A further generic aspect of the invention relates to a method of making the frame.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 3 is a top plan view of one part that in cooperation with other parts forms a cross member of the chassis frame.

FIG. 4 is an end view in the direction of arrows 4-4 in FIG. 3.

FIG. 5 is a bottom plan view of another part that in cooperation with the part of FIG. 3 and other parts forms the cross member of the chassis frame.

FIG. 6 is an end view in the direction of arrows 6-6 in FIG. 5.

DESCRIPTION OF THE PREFERRED EMBODIMENT

Figure 1:
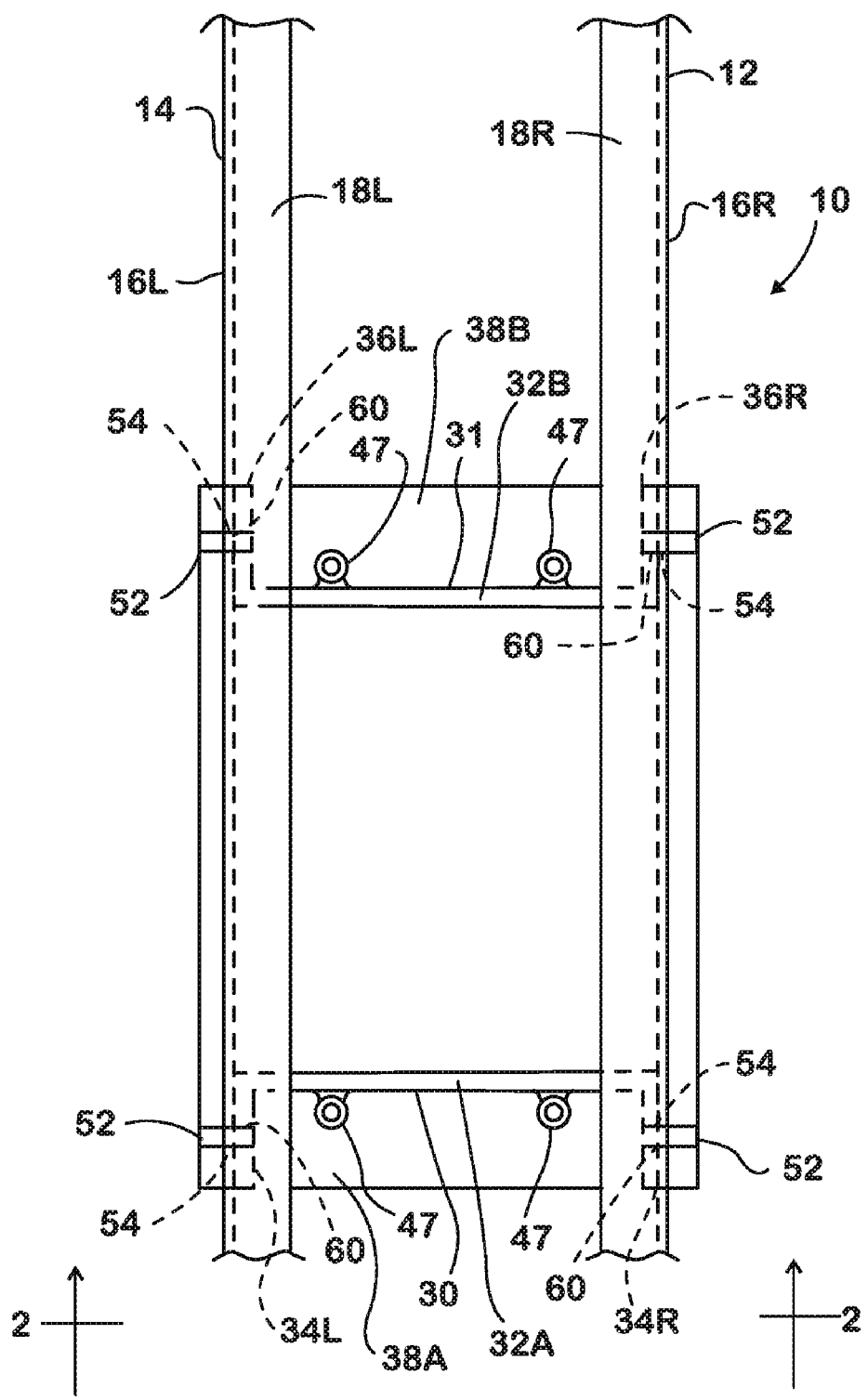
FIG. 1 is a top plan view of a portion of a chassis frame in accordance with principles of the invention at one stage of an assembly process.

FIG. 1 shows a portion of a chassis frame 10 during the process of assembly. Frame 10 comprises right and left side rails 12, 14 running lengthwise of the frame and comprising respective steel channels. As further seen in FIG. 2, each channel has an interior bounded by a respective vertical wall 16R, 16L, a respective horizontal top flange 18R, 18L, and a respective horizontal bottom flange 20R, 20L. The channel interiors confront each other across the width of the frame, with the flanges of each extending from the top and bottom of the respective vertical wall 16R, 16L toward corresponding flanges of the opposite channel.

Frame 10 further comprises a lower channel 22 and an upper channel 24 running lengthwise of the frame. Although they are not hinged together, these two channels are similar to "clams" of a clam shell in that they are constructed and arranged to capture side rails 12, 14 between them. Channel 22 is shown by itself in FIGS. 3 and 4, and channel 24, in FIGS. 5 and 6.

Lower channel 22 comprises a horizontal bottom wall 26L that bridges the side rails and is disposed against bottom flanges 20R, 20L of the side rail channels. Channel 22 further comprises vertical side flanges 28L, 30L that extend from opposite sides of bottom wall 26L upward and against a face of a respective one of vertical walls 16L, 16R that is exterior to the interior of the respective channel.

Upper channel 24 comprises a horizontal top wall 26U that bridges the side rails and is disposed against top flanges 18R, 18L of the side rail channels. Channel 24 further comprises vertical side flanges 28U, 30U that extend from opposite sides of top wall 26U downward and against the same exterior face of vertical walls 16L, 16R that flanges 28L, 30L are against. Wall 26U also has a central rectangular opening 27.

Spacer structure is disposed between and in abutment with the side rail channels to provide interior support to the frame rails as they are being captured from the exterior by the "clams". The illustrated spacer structure comprises several parts that form two separate spacer structures at opposite lengthwise ends of channels 22, 24. The spacer structures also function to provide interior support to the "clams" as will be more fully explained later.

Each of the two spacer structures comprises a respective channel 30, 31 having a respective vertical rectangular wall 32A, 32B spanning the two side rail channels. Channel 30 has respective vertical flanges 34R, 34L that are disposed flat against the interior faces of side rail walls 16R, 16L respectively. Channel 31 has respective vertical flanges 36R, 36L that are disposed flat against the interior faces of side rail walls 16R, 16L respectively. The height of each channel 30, 31 is dimensioned to fit snugly within the interior of each side rail channel such that the top and bottom edges of the vertical flanges and the adjoining portions of the vertical walls 32A, 32B are disposed between top flanges 18R, 18L and bottom flanges 20R, 20L, ideally in full contact with the flanges, but as a practical matter with substantial contact due to manufacturing tolerances. Walls 32A, 32B are set inward of the lengthwise ends of the upper and lower channels 24, 22 and the vertical flanges 34R, 34L, 36R, 36L extend outward from the respective wall 32A, 32B to end substantially at the lengthwise ends of the upper and lower channels.

Each of the two spacer structures further comprises a respective horizontal rectangular plate 38A, 38B. Plate 38A is disposed flat against the top face of wall 26L at one lengthwise end of channel 22, and plate 38B is disposed flat against that same face at the opposite lengthwise end. The plates are preferably welded to the channel. The length of plate 38A, which runs across the width of frame 10, is dimensioned such that the plate's end edges are disposed against the free end edges of the bottom flanges 20R, 20L of the side rail channels. Likewise the length of plate 38B is dimensioned such that the plate's end edges are disposed against the free end edges of flanges 20R, 20L. The thicknesses of the plates are equal to the thicknesses of the side rail flanges.

Each of the two spacer structures still further comprises a respective horizontal rectangular plate 40A, 40B. Plate 40A is disposed flat against the bottom face of wall 26U at the lengthwise end of channel 24 directly vertically above plate 38A, and plate 40B is disposed flat against that same face of wall 26U at the other lengthwise end vertically above plate 38B. The plates are preferably welded to the channel. The length of plate 40A running across the width of frame 10 is dimensioned such that the plate's end edges are disposed against the free end edges of top flanges 18R, 18L of the side rail channels. Likewise the length of plate 40B is dimensioned such that the plate's end edges are disposed against the free end edges of flanges 18R, 18L, and the thicknesses of the plates are equal to the thicknesses of the side rail flanges.

The top and bottom edges of walls 32A, 32B of channels 30 and 31 that lie between the side rails are disposed against inward margins of plates 38A, 38B, 40A, 40B.

Each plate 38A, 38B, 40A, 40B comprises two vertical through-holes 44 near its opposite lengthwise ends and spaced inward of a respective side rail channel. The two holes in each plate are in registration with a respective pair of vertical through-holes 46 in the respective wall 26L, 26U. The holes 44, 46 are slightly outward of walls 32A, 32B of channels 30, 31 and slightly inboard and clear of side rails 12, 14.

Each spacer structure further comprises a pair of vertical tubes 47 that are joined to walls 32A, 32B in any suitably appropriate way, such as by welding. The tube lengths are equal to the heights of walls 32A, 32B and the tubes are joined to those walls at locations that place each tube in alignment with corresponding sets of holes 44, 46 in the upper and lower "clams".

The shank of a respective headed screw 48 passes through each set of aligned through-holes 46, 44 in wall 26U and plates 40A, 40B, through the corresponding tube 47, and through the underlying set of through-holes 44, 46 in plates 38A, 38B and wall 26L. The length of each tube, like the height of each wall, 32A, 32B, is substantially equal to the vertical distance between the faces of each pair of plates 38A, 40A, and 38B, 40B that confront each other at the lengthwise ends of the "clams". Each screw head bears against wall 26U, and a respective nut 50 is threaded onto the opposite end of the screw shank and tightened to force the "clams" toward each other, clamping them tightly not only onto side rails 12, 14 in the process, but also against the ends of tubes 47 between the side rails and the top and bottom edges of walls 32A, 32B. The free ends of flanges 28U, 28L, 30U, and 30L are spaced apart so as not to come into abutment. This fastening together of the upper and lower "clams" applies axial compression force to tubes 47 and walls 32A, 32B, and the tubes and walls correspondingly exert forces against the portions of the clams that span the space between the side rails to impart great rigidity to the frame. The fastening also forces the side rail flanges 18R, 18L, 20R, 20L against the vertically oriented flanges 34R, 34L, 36R, 36L of channels 30 and 31 and adjoining portions walls 32A, 32B. The ends portions of channels 30 and 31, which are thereby placed in compression like tubes 47, also exert opposite forces on the side rails to further contribute to the intense rigidity of the resulting structure.

Each flange 28U, 28L, 30U, and 30L has a pair of through-holes 52 each of which aligns with a corresponding through-hole 54 in a corresponding vertical wall 16R, 16L of the side rail channels. A pair of respective weld nuts 56 are affixed to the faces of respective flanges 34R, 34L, 36R, 36L that are opposite the faces that are against the vertical walls 16R, 16L of side rails 12, 14. Each weld nut 56 aligns with a respective through-hole 60 in the respective flange that is also in alignment with a respective set of through-holes 52, 54. The shank of a respective headed screw 62 passes through each set of through-holes 52, 54, 60, and the screw is tightly screwed into the respective nuts 56 to force the flanges of the "clams" against the exterior faces of the vertical walls of the side rails.

Figure 2:
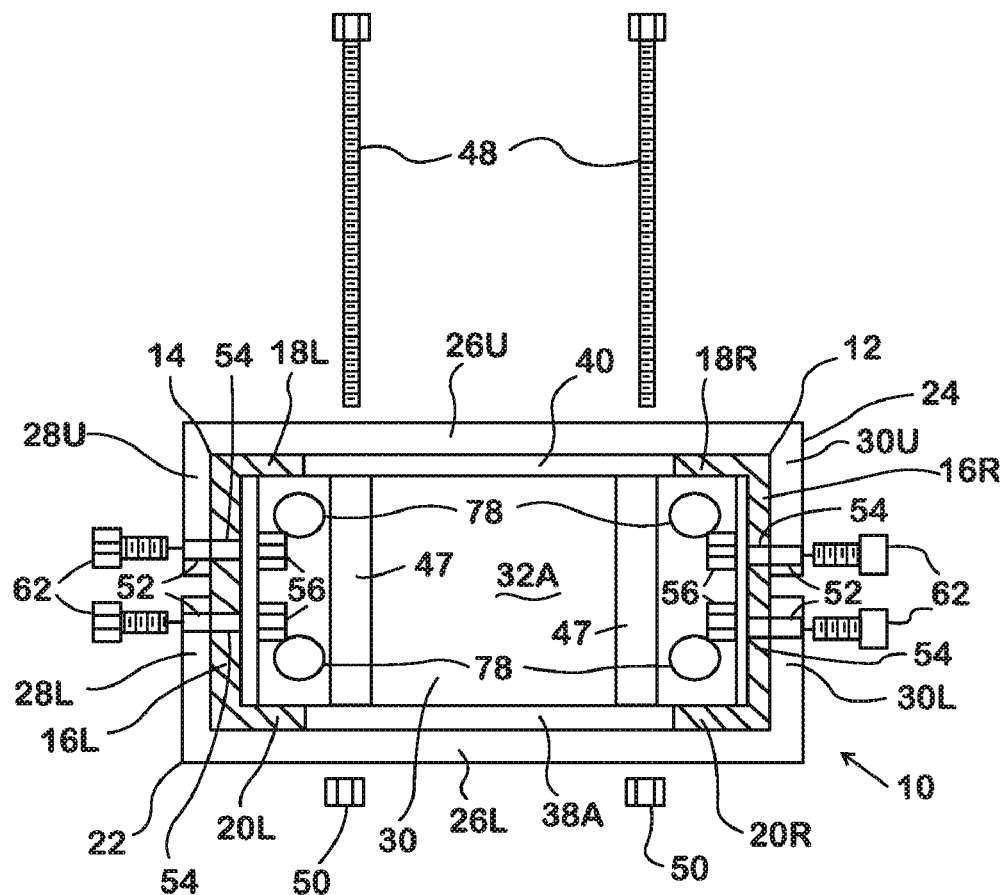
FIG. 2 is an end view of the chassis frame at a later stage of the assembly process in the direction of arrows 2-2 in FIG. 1.

The construction that has been described creates a cross member that is defined by four channels 22, 24, 30, 31, and four plates 38A, 38B, 40A, 40B to fit with substantial conformity against substantially the entire interior and exterior surfaces of the side rail channels as viewed in FIG. 2. It is only at the clearance gaps between the free ends of the flanges of the "clams" where the side rail surfaces are exposed. The side rails are thereby essentially locked together in a way that creates surface-to-surface contact of the cross member to almost all of the surface of the side rail channels at the locations of channels 30, 31 and plates 38A, 38B, 40A, 40B. A total of only twelve fasteners is required.

By welding tubes 47 to channels 30, 31, by welding plates 38A, 38B to "clam" 22, and by welding plates 40A, 40B to "clam" 24, only four parts, excluding the fasteners, need to be handled on a truck assembly line. This can significantly simplify assembly line operations, yielding cost and product improvement benefits in the process.

The resulting construction imparts great rigidity to the frame with a significantly smaller number of parts and fastening operations when compared with commonly manufactured frames. Apart from the economy in manufacturing, the greater rigidity of the inventive frame has beneficial effects that extend to use of a vehicle that contains the frame, such as better maintenance of alignments in the steering and suspensions systems and better road handling performance.

Figure 7:
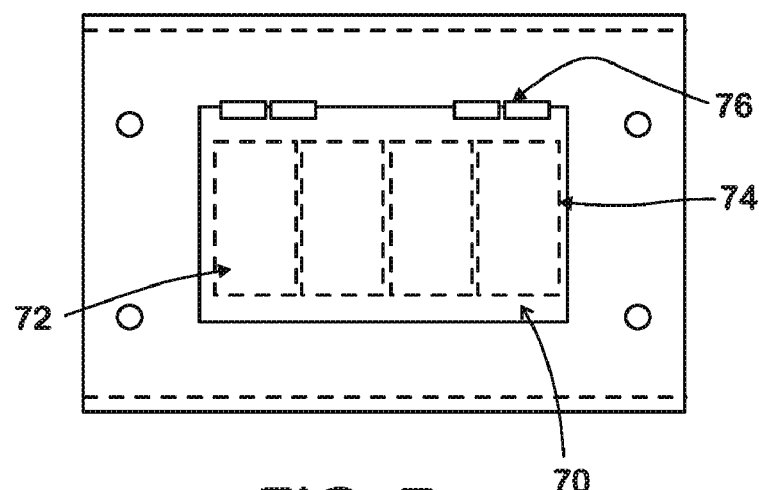
FIG. 7 is a top plan view of the part shown in FIGS. 5 and 6 at a further stage of assembly.

A still further advantage that can be obtained is that the cross member structure inherently creates a hollow interior that can be used as a compartment like the one shown in FIG. 7. That compartment is large enough to serve as a battery compartment 70 for a bank of DC storage batteries, as is commonly found in large trucks. FIG. 7 shows a bank of batteries 72. The compartment is closed by a door 74 that is hinged along one side such as at 76 to allow the door to be swung open and provide access to the interior of the compartment. If a compartment is not needed, then opening 27 can be omitted.

Through-holes 78 in walls 32A, 32B provide passage for one or more of electrical, fluid, and pneumatic lines through the cross member.

While the parts can be assembled in various order, the commonality of assembly steps involves disposing the spacer structures between and against confronting interiors of the side rail channels and between and against the free ends of the confronting top and bottom flanges of the side rail channels. The side rail channels are captured between the "clams" such that the bottom wall of the lower "clam" bridges the side rail channels with the lower "clam" flanges extending upward from opposite sides of the bottom wall against faces of respective ones of vertical walls of the side rail channels that are exterior to the interiors of the side rail channels, and such that the top wall of the upper "clam" also bridges the side rail channels with the upper "clam" flanges extending downward from opposite sides of the top wall and against the exterior faces of respective ones of the vertical walls of the side rail channels. The upper and lower "clams" are fastened together and to the side rail channels. To the extent that surfaces that are disposed against each other prior to fastening have only partial, as opposed to total contact, the tightening of the fasteners creates fuller surface-to-surface contact, which ideally would be full contact, but as a practical matter, may be only substantially full contact. The fastening of the "clams" together on the exterior of the side rails is resisted by spacer structure on the interior which increasingly comes into compression as tightening increases, thereby creating what amounts to a rigid structural box.

The following example of one possible assembly process on a truck assembly line shows how gravity can be used to advantage. The side rails are dropped onto the lower "clam." Then the two spacer structures are placed between the side rails at opposite lengthwise ends of the "clams" and preliminarily fastened to the side rails. Electrical, fluid, and/or pneumatic lines can be passed through holes 78 as required before the upper "clam" is placed over the side rails. The upper and lower "clams" can then be preliminarily fastened together using screws 48 and nuts 50. Then the upper clam is fastened to the side rails. Final tightening of all fasteners then performed in an appropriate sequence.

If the cross member lacks an opening (such as opening 27) to its interior, the electrical, fluid, and/or pneumatic lines should be passed through before the upper "clam" is placed. Alternatively, an inaccessible interior could have guide tubes running between the pass-through openings for guiding lines through the interior after the upper "clam" has been placed.

Principles of the present invention enable a chassis frame to be fabricated from a relatively small number of parts structurally arranged to minimize weight in conjunction with improving rigidity and durability of a frame. Weight minimization and durability are critical priorities in heavy vehicle manufacture. While the structural parts that form the cross member will have appropriate thicknesses for enabling a particular frame to handle specified static and dynamic loads, and therefore impart a corresponding weight to the cross member based on the volume of each part and the density of the part material, the manner in which cross member has been shown to structurally associate with the side rails ties a portion of the lengths of the side rails together in a way that basically creates a rigid box having a hollow interior. Moreover, the possibility of using a minimum of only twelve fasteners, as in the disclosed preferred embodiment, to assemble the cross member to the side rails is a significant reduction in the number of fasteners and fastening operations currently in use in today's typical chassis frames.

Principles of the invention extend to various truck vocations. Some representative examples are explained below.

A highway tractor could have a relatively lighter duty/lighter weight version that uses two 6" wide plates 38A, 38B on the bottom clam and similarly two 6" wide plates 40A, 40B on the top clam, as shown in the drawings.

An off-highway tractor could have a heavy duty/heavier version (not shown in the drawings) which would add two 4" plates to the bottom and top clams each disposed against and welded to the respective wall 26L, 26U to fill the space between the respective pair of plates 38A, 38B and 40A, 40B. Wall 26U would not necessarily require opening 27 in this version.

An off-road tractor (such as sometimes used in the military and in the logging and construction industries) could have an extreme duty, heavy version that replaces plates 38A, 38B by a single plate having the same length as the bottom clam but keeping the off-highway tractor upper clam with the two separate plates 40A, 40B and opening 27 to allow access to the interior of the cross member through door 54.

While a presently preferred embodiment of the invention has been illustrated and described, it should be appreciated that principles of the invention apply to all embodiments falling within the scope of the following claims.

What is claimed is:

1. A chassis frame comprising:
right and left side rails running lengthwise of the frame and comprising respective channels each of which has an interior bounded by a vertical wall and horizontal top and bottom flanges that extend from top and bottom of the vertical wall toward corresponding flanges of the opposite side rail,
a lower channel running lengthwise of the frame and comprising a horizontal bottom wall that bridges the side rails and is disposed against the bottom flanges of the side rail channels and vertical side flanges that extend from opposite sides of the bottom wall upward and against a face of a respective one of the vertical walls that is exterior to the interior of the respective channel;
an upper channel running lengthwise of the frame and comprising a horizontal top wall that bridges the side rails and is disposed against the top flanges of the side rail channels and vertical side flanges that extend from opposite sides of the top wall downward and against the exterior face of a respective one of the vertical walls of the respective channel;
and spacer structure disposed vertically between the upper and lower channels and horizontally between and in abutment with the side rail channels wherein the spacer structure comprises respective spacer structures at opposite lengthwise ends of the upper and lower channels.

2. A chassis frame as set forth in claim 1 wherein each of the respective spacer structures comprises a channel having a vertical wall terminating in vertical flanges disposed against faces of vertical walls of the side rail channels that are on the interiors of the side rail channels.

3. A chassis frame as set forth in claim 2 wherein the vertical walls of the spacer structure channels are set inward of the lengthwise ends of the upper and lower channels and the vertical flanges of each spacer structure channel extend outward from the vertical wall of their respective spacer structure channel.

4. A chassis frame as set forth in claim 3 wherein the vertical flanges of each spacer structure channel extend outward from the vertical wall of their respective spacer structure channel to end substantially at the lengthwise ends of the upper and lower channels.

5. A chassis frame as set forth in claim 3 including fasteners that at each side rail fasten the respective vertical wall of the respective spacer structure channel, the vertical wall of the respective side rail channel, and the respective side flange of the lower channel together, and that at each side rail fasten the respective vertical wall of the respective spacer structure channel, the vertical wall of the respective side rail channel, and the respective side flange of the upper channel together.

6. A chassis frame as set forth in claim 5 including fasteners that fasten the horizontal bottom wall of the lower channel and the horizontal top wall of the upper channel together at locations that are outward of the vertical walls of the spacer structure channels and inward of the side rails, and wherein spacer structure includes tubes through which the fasteners pass.

7. A chassis frame as set forth in claim 2 wherein the spacer structure further comprises at least one plate disposed on an interior face of the horizontal bottom wall of the lower channel and having end edges disposed against free end edges of the bottom flanges of the side rail channels, and at least one plate disposed on an interior face of the horizontal top wall of the upper channel and having end edges disposed against free end edges of the top flanges of the side rail channels.

8. A chassis frame as set forth in claim 7 wherein the at least one plate disposed on an interior face of the horizontal top wall of the upper channel comprises two plates separated by a central opening in the horizontal top wall of the upper channel.

9. A chassis frame as set forth in claim 8 including a closure for opening and closing the central opening.

10. A chassis frame as set forth in claim 1 wherein the spacer structure comprises one or more pass-throughs extending lengthwise of the frame to provide passage for one or more of electrical, fluid, and pneumatic lines through the spacer structure.

11. A chassis frame as set forth in claim 1 wherein the spacer structure comprises a compartment disposed between the side rail channels and between lengthwise ends of the upper and lower channels.

12. A chassis frame as set forth in claim 11 comprising a closure that can be opened to provide access to the interior of the compartment.

13. A method of making a chassis frame comprising:
   disposing spacer structure between and in abutment with confronting interiors of right and left side rail channels and between and against free ends of confronting top and bottom flanges of the side rail channels,
   capturing the side rail channels and the spacer structure between a lower channel and an upper channel such that a bottom wall of the lower channel bridges the side rail channels and flanges that extend upward from opposite sides of the bottom wall are disposed against faces of respective ones of vertical walls of the side rail channels that are exterior to the interiors of the side rail channels, and such that a top wall of the upper channel bridges the side rail channels and flanges that extend downward from opposite sides of the top wall are disposed against the exterior faces of respective ones of the vertical walls of the side rail channels,
   and fastening the upper and lower channels to the side rail channels wherein the step of disposing spacer structure between and in abutment with confronting interiors of right and left side rail channels and between and against free ends of confronting top and bottom flanges of the side rail channels comprises:
   disposing respective spacer structures at opposite lengthwise ends of the upper and lower channels.

14. A method as set forth in claim 13 wherein the step of disposing spacer structure between and in abutment with confronting interiors of right and left side rail channels and between and against free ends of confronting top and bottom flanges of the side rail channels comprises:
   disposing a horizontal rectangular plate between and against the free ends of the bottom flanges of the side rail channels,
   disposing a horizontal rectangular plate between and against the free ends of the top flanges of the side rail channels, and
   disposing vertical flanges at opposite sides of a vertical channel between the top and bottom flanges of both side rail channels and against the vertical walls of the side rail channels so that the vertical channel spans the side rail channels.

15. A method as set forth in claim 13 further including using one or more fasteners to fasten together the spacer structure, the upper and lower channels, and the side rail channels.

* * * * *